United States Patent [19]

Ishikawa

[11] Patent Number: 4,785,351
[45] Date of Patent: Nov. 15, 1988

[54] PICTURE SIGNAL CONVERTING DEVICE

[75] Inventor: Hisashi Ishikawa, Yokohama, Japan

[73] Assignee: Canon Kabushiki Kaisha, Tokyo, Japan

[21] Appl. No.: 933,634

[22] Filed: Nov. 21, 1986

[30] Foreign Application Priority Data

Nov. 29, 1985 [JP] Japan .................................. 60-267283

[51] Int. Cl.⁴ ........................ H04N 7/01; H04N 7/12; H04N 7/13
[52] U.S. Cl. .................................... 358/140; 358/105; 358/136
[58] Field of Search .................. 358/140, 11, 136, 105

[56] References Cited

U.S. PATENT DOCUMENTS 4,414,571  11/1983  Kureha ................................... 358/22
4,672,443  6/1987  Dischert ............................. 358/140
4,672,445  6/1987  Casey ................................. 358/140

Primary Examiner—Howard W. Britton
Attorney, Agent, or Firm—Robin, Blecker & Daley

[57] ABSTRACT

A picture signal converting device receptive of a picture signal with its frame made up of two fields each having a prescribed number of scanning lines for increasing the number of scanning lines in each field in such a way that a first interpolating signal is formed by using the picture signal for the field correlated to the present field in terms of time, a second interpolating signal is formed by using the picture signal for the field correlated to the present field in terms of space, and the movement of a picture between the preceding and next frames is detected by using the picture signals for the preceding and next fields relative to the present frame. As the value it took before a prescribed time is stored, depending on the difference between the speeds of movement of the picture at the present time and the prescribed time ago, at least one of the first and second interpolating signals is used to form an interpolating picture signal for the present field.

22 Claims, 5 Drawing Sheets

PICTURE SIGNAL CONVERTING DEVICE

BACKGROUND OF THE INVENTION

1. Field of the Invention

This invention relates to devices for converting television signals or other picture signals.

2. Description of the Related Art

The television signal of the NTSC system at the present time has 262.5 scanning lines for each field period or 1/60 sec. and, as the interlaced scanning is performed, 525 scanning lines for one frame. It is known to provide a picture signal converting circuit for increasing the number of scanning lines for each field of the television signal of the present day, for example, 2 times so that such a television signal is displayed on the high-resolution fine monitor or the like.

FIG. 1 illustrates the basic construction of this conventional picture signal conversion processing circuit.

As shown in FIG. 1, the television signal (analog signal) enters at an input terminal 1 and its high region is cut by a low pass filter (LPF) 2. It is then converted to a digital signal by an A/D converter 3. The output of the A/D converter 3 is applied to both of a first time axis compression circuit 5 and a field memory 4. The signal from the field memory 4 is applied to a second time axis compression circuit 6.

The output of the field memory 4 represents the signal for the preceding field which, in the case of the 2:1 interlaced scanning, traces the intermediates between the successive scanning lines of the present field. The time axes of such signals for the present and preceding frames from the A/D converter 3 and the field memory 4 are compressed to ½ by the time axis compression circuits 5 and 6 respectively. Then, their outputs are selected by a changeover switch 7 operating each time the scanning line of compressed time base is recycled so that the signals from both circuits 5 and 6 are taken out to produce a signal of the doubled number of scanning lines which is then applied to a D/A converter 8 which operates with a frequency equal to 2 times the sampling frequency of the aforesaid A/D converter 3. Further, the analog signal from this D/A converter 8 is made to pass through the LPF 9 which has a cut-off frequency equal to 2 times that of the aforesaid LPF 2. Thus, a high-resolution analog television signal of the doubled number of scanning lines is obtained at an output terminal 10.

The application of the above-described basic feature to the composite color television system is shown fundamentally in FIG. 2.

In FIG. 2, the composite color television signal from an input terminal 11 is separated to a luminance signal Y and a chrominance signal C by a Y/C separation circuit 12. The chrominance signal C is demodulated to color difference signals, for example, I and Q signals by a color demodulation circuit 13. The luminance signal Y is treated for an increase in the resolution (the doubled number of scanning lines) by a signal converting circuit 14 of the construction shown in FIG. 1.

Even for the color difference signals I and Q also, the same treatment as that for the luminance signal Y is carried out by a signal converting circuit 15. Along with the resolution-increased luminance signal from the circuit 14, they are converted to R, G and B signals for the three primary colors in passing through the matrix circuit 16, being displayed on the high-resolution color monitor 17.

In such scanning frequency doubling process, as shown in FIG. 3, a present field is formed in such a way that the intervals between the successive two scanning lines A and B of the present field are filled at interpolated positions X with the corresponding scanning lines X' of the preceding field i−1. That is, as the interpolating signal for the present field, use is made of the signal of the preceding field without any alternation.

With such a prior known technique, however, for a displayed picture of fast motion, the definition of the picture cannot always satisfactorily be obtained, although, when the motion is slow, the high resolution and high quality of the picture is assured on the display.

From this reason, there has been a previous proposal for making use, as the interpolating signal for the picture positions X, of an averaged signal of the corresponding upper and lower scanning lines A and B when the motion of the picture is fast. That is, as shown in FIG. 4, detecting means A is used to compare the difference between the signals for the preceding and next fields i−1 and i+1 with a fixed threshold value TH. When the speed of motion of the picture is determined to be faster than the prescribed limit, the output of a second signal forming means C which is a signal for interpolation of a present field i as was formed by using its own scanning lines is selected to be applied to an interpolating signal forming means D. When the motion is slow, the output of a first signal forming means B which is a signal for interpolation of the present field as was formed by using the signals of the preceding and next fields i−1 and i+1 is selected to be applied to that means D.

The prior known device of FIG. 4 is further explained in more detail. For note, the similar parts to those shown in FIG. 1 are denoted by the same reference characters. The analog television signal of the NTSC system from the input terminal 1 passes through the LPF 2 to the A/D converter 3. The signal from the A/D converter 3 is applied to a 262H (where H is the horizontal scan period) delay circuit 18 having an output which is connected to the input of a 1H delay circuit 19 having an output which is connected to the input of another 262H delay circuit 20.

Therefore, the scanning line signal X32 for the next field i+1 (produced directly from the A/D converter 3) is followed, after the delay of 262H, by the scanning line signal X23 for the present field from the delay circuit 18, then, after the further delay of 1H, by the scanning line signal X21 from the delay circuit 19, and then, after the further delay of 262H, by the scanning line signal X12 for the preceding field from the delay circuit 20, as shown in FIG. 5.

The outputs of the first 262H delay circuit 18 and the 1H delay circuit 19 are applied to an adder 21. The output of this adder 21 is applied to a ½ coefficient circuit 22. Hence, the ½ coefficient circuit 22 produces an output signal for interpolation in field of (X21+X23)/2.

Also, the outputs of the A/D converter 3 and the second 262H delay circuit 20 are applied to another adder 23. The output of this adder 23 is applied to another ½ coefficient circuit 24. Hence, the ½ coefficient circuit 24 produces an output signal for interpolation in between fields of (X12+X32)/2.

The outputs of these two ½ coefficient circuits 22 and 24 are selectively applied to the time base compression circuit 6 by the switch 25 in response to a control signal therefor as will be described more fully later. The output X21 of the 1H delay circuit 19 is applied to the time base compression circuit 5.

Meanwhile, in a subtractor 26, the difference between the frames is obtained in the form of a signal α representing the difference between the picture signal X12 and X32 for the preceding and next fields i−1 and i+1 as shown in FIG. 5. Then, the absolute value |α| of such a difference signal α is obtained by an absolute value circuit 28. The output of the absolute value circuit 28 is compared with a prescribed reference level TH by a comparator 27. And, when the output signal of the comparator 27 has "H" (high level), as the displayed picture is taken as motionless, the switch 25 is set to select the ½ coefficient circuit 24. When the output signal of the comparator 27 has "L" (low level), as the motion of the displayed picture is regarded as fast, the switch 25 is changed over to select the first ½ coefficient circuit 22.

However, in the type of device shown in FIG. 4, it is based on the difference between the signals for the preceding and next fields to the present field to be interpolated that the motion of the picture is detected. Therefore, if a rapid change of information has occurred in the signal for one field only, this cannot be detected. Thus, a problem of deteriorating the picture quality very seriously has arisen.

That is, because, in the above-described circuit, determination of which interpolating signal, (X21+X23)/2 for interpolation within the field, or (X12+X32)/2 for interpolation between the two fields, is to be selected is made depending on whether or not the absolute value of the difference signal between the preceding and next fields, or |X32−X12|, is larger than the reference level TH, it results that even when the absolute value is, for example, smaller than the reference level TH to regard the displayed picture as a still picture, for, as a rapid motion and a sharp change in brightness are suddenly occurring only in the present field, the correlation of the present field with the preceding and next fields, that interpolating signal which has been obtained from the preceding and next fields, or (X12+X32)/2, is also selected to be used as the interpolating signal for the present field. Since this interpolating signal (X12+X32)/2 is based on the utilization of the correlation of the present field with the preceding and next fields, if the present field has little correlation with the preceding and next fields as has been described above, it is in the present field that no correlation is established between each of the scanning lines formed by the interpolating signal (hereinafter referred to as the "interpolated lines") and its adjacent upper or lower line. This constitutes the problem of lowering the picture quality largely. To eliminate this problem, therefore, it is advantageous to make use of second processing means so that the interpolating is performed within the individual field.

SUMMARY OF THE INVENTION

An object of the present invention is to provide a picture signal converting device which enables the above-described problem to be solved.

Another object is to provide a picture signal converting device which enables an interpolating picture signal for the present field to be obtained in the suited form to the motion of the picture between the fields.

Under such objects, according to the present invention, in an embodiment thereof, the picture signal converting device receptive of a picture signal with its one frame made up of two fields each having a prescribed number of scanning lines for increasing the number of scanning lines in each field, is made constructed, comprising first interpolating signal forming means receptive of the picture signal for the field correlated to a present field in terms of time for producing a first interpolating signal, second interpolating signal forming means receptive of the picture signal for the field correlated to the present field in terms of space for producing a second interpolating signal, motion detecting means receptive of the picture signals for the preceding and next fields relative to the present field for detecting the amount of movement of the picture between the preceding and next fields, holding means for holding that output of the motion detecting means which has occurred before a prescribed time, and interpolating picture signal forming means receptive of at least one of the first and second interpolating signals depending on that output of the motion detecting means which occurs at the present time and the output of the holding means for producing an interpolating picture signal for the present field.

Another object of the invention is to provide a picture signal converting device which enables an improvement of the definition of the picture to be achieved by obtaining an appropriate interpolating picture signal for the present field to the motion of the picture between the fields, while still permitting the structure to be simplified.

Under such an object, according to the present invention, in an embodiment thereof, the picture information signal converting device receptive of a picture signal with its one frame made up two fields each having a prescribed number of scanning lines for increasing the number of scanning lines in each field, comprises first interpolating signal forming means receptive of the picture signal for the field correlated to the present field in terms of time for producing a first interpolating signal, second interpolating signal forming means receptive of the picture signal for the field correlated to the present field in terms of space, difference information signal generating means receptive of the picture signals for the preceding and next fields relative to the present field for producing a signal representing the difference between the informations of the picture signals for the preceding and next fields, information compressing means for compressing the output of the difference information signal generating means to produce a signal representing the compressed difference information, and interpolating picture signal forming means receptive of at least one of the first and second interpolating signals depending on the state of the output of the information compressing means for producing an interpolating picture signal for the present field.

Still another object of the present invention is to provide a picture signal converting device for producing an interpolating picture signal for the present field by forming an interpolating signal with the use of the field correlated to the present field in terms of time or space in such a way as to respond as a function of the amount of motion of the picture between the fields.

Under such an object, according to the present invention, in an embodiment thereof, the picture signal converting device receptive of a picture signal with its one frame made up of two fields each having a prescribed number of scanning lines for increasing the number of scanning lines comprises first interpolating signal forming means receptive of picture information signal for the field correlated to the present field in terms of time for producing a first interpolating signal, second interpolating signal forming means receptive of a picture information signal for the field correlated to the present field in terms of space for producing a second interpolating signal, motion detecting means receptive of picture signals for the preceding and next fields relative to the present field for detecting the motion of the picture between the preceding and next fields, and interpolating picture signal forming means receptive of both of the first and second interpolating signals depending on the output of the motion detecting means for producing an interpolating picture signal for the present field.

These and other objects and features of the invention will become apparent from the following detailed description of embodiments thereof by reference to the accompanying drawings.

DETAILED DESCRIPTION OF THE PREFERRED EMBODIMENTS

Figure 3:
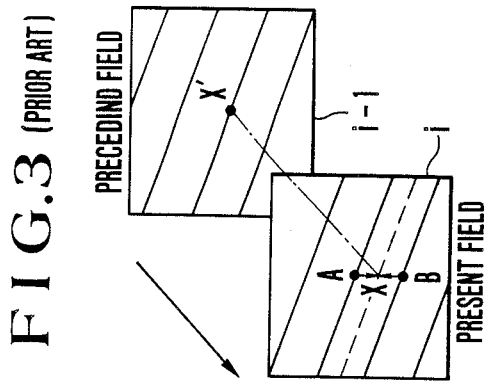
FIG. 3 is a diagram taken to explain the operation of the system of FIG. 1.
Figure 1:
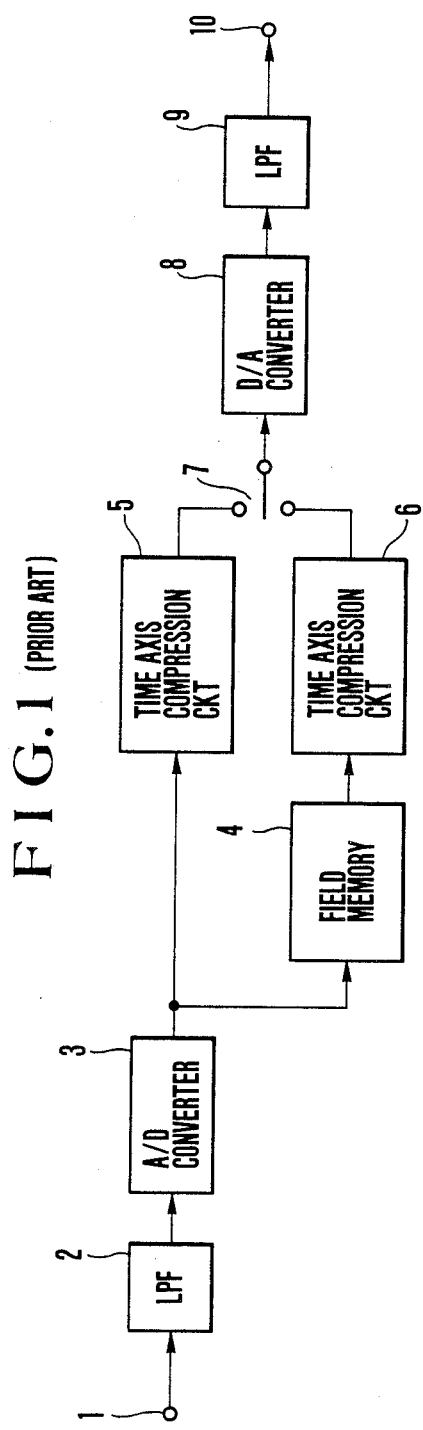
FIG. 1 is a block diagram illustrating the basic construction of the conventional picture signal conversion processing circuit.
Figure 2:
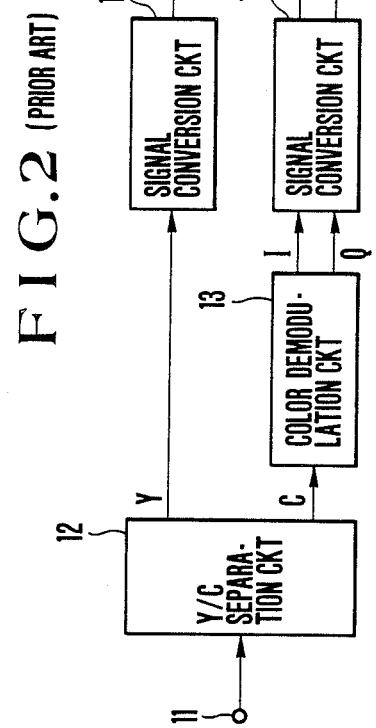
FIG. 2 is a block diagram illustrating an example of application of the circuit of FIG. 1 to the composite color television system.

In the following, the embodiments of the invention are explained based on FIG. 6, FIG. 7 and FIG. 8. For note, the same or equivalent parts as or to those of the above-described conventional examples are denoted by the same reference characters, and their detailed explanation is omitted.

Figure 4:
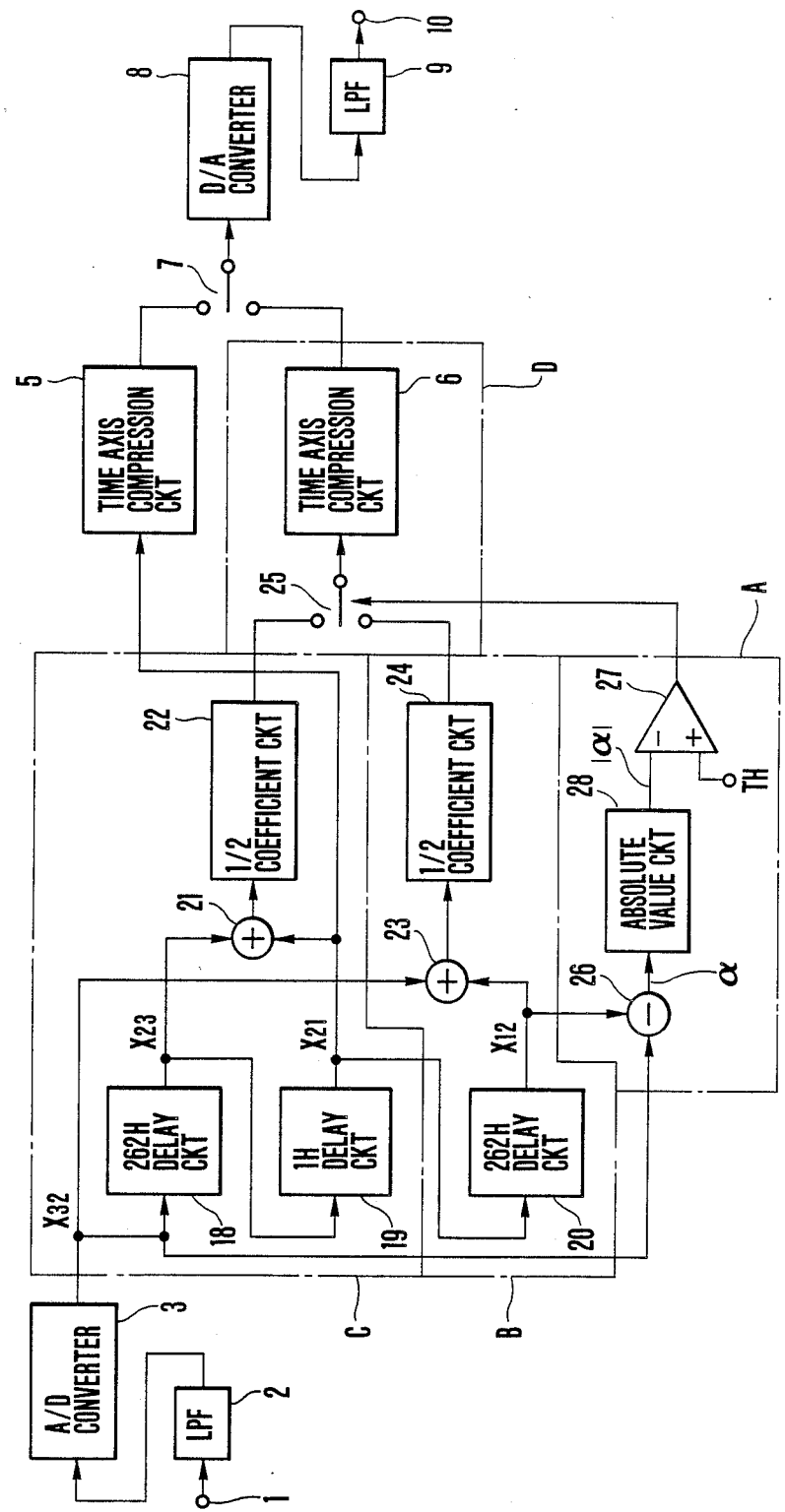
FIG. 4 is a block diagram of another example of the conventional picture signal conversion device.
Figure 6:
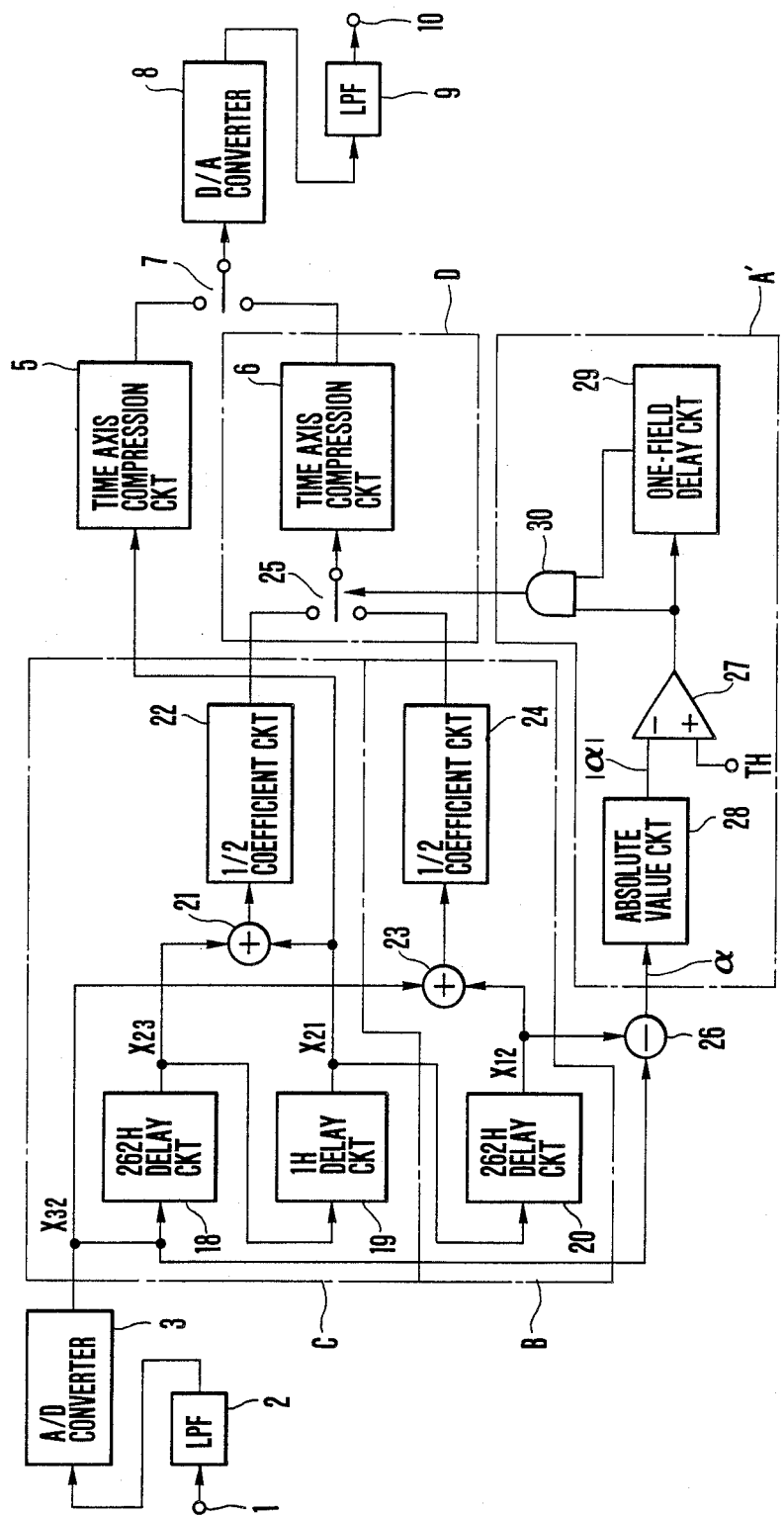
FIGS. 6 and 7 are block diagrams of first and second embodiments of the picture signal conversion device according to the present invention respectively.

FIG. 6 in diagram illustrates the first embodiment of the invention. In this embodiment, detecting means A' for detecting a change of the picture between the adjacent frames is constructed as obtained by inserting a 1-field delay circuit 29 and an AND circuit 30 into the rear stage of the comparator 27 in the detecting means A shown in FIG. 4. For note, the above-described prior known first signal forming means B, second signal forming means C and interpolating signal forming means D are used herein without any alteration.

Figure 5:
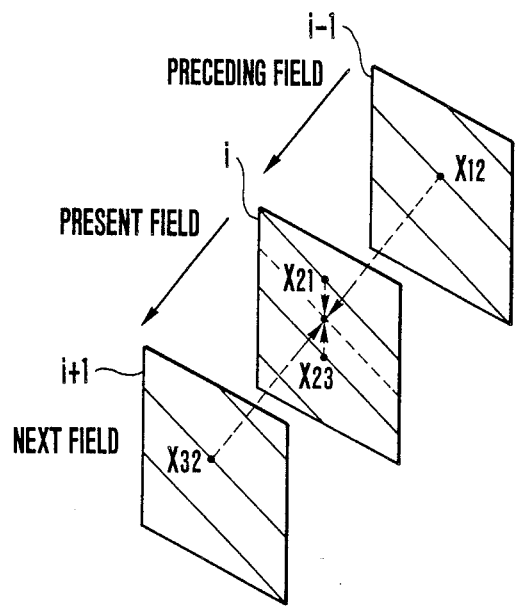
FIG. 5 is a diagram taken to explain the operation of the device of FIG. 4.

In the above-described construction, the comparator 27 produces a "H" (high level) signal when the level of the absolute value $|\alpha|$ of the difference-between-frames signal $\alpha$ is lower than the reference level TH, as the displayed picture is regarded as standstill. Conversely when it is higher than the reference level TH, as it is regarded as moving, an "L" signal is produced. This output is, similarly to the conventional examples, a motion detecting signal of the preceding and next fields, and is applied to the 1-field delay circuit 29 and one of the inputs of the AND circuit 30. The AND circuit 30 takes the logical product of the presently inputted motion detecting signal of the preceding and next fields and the 1-field preceding motion detecting signal past the 1-field delay circuit 29. This 1-field preceding motion detecting signal refers to a change detecting signal between the field picture signal that precedes the preceding field i−1 shown in FIG. 5, (hereinafter called the "twice preceding field" picture signal) and the present field picture signal. If the taking of the logic product results in the output of the "H" signal, the switch 25 is changed over to select the $\frac{1}{2}$ coefficient circuit 24. If in the output of the "L" signal, the other $\frac{1}{2}$ coefficient circuit 22 is selected. In other words, only when the changes between the present field and the twice preceding field and between the next field and the preceding field are regarded both as little, the signal for interpolation between fields from the first signal forming means B is selected to be used as the interpolating signal. Or otherwise, the signal for interpolation in field from the second signal forming means C is selected as the interpolating signal. For note, the 1-field delay circuit 29 is constructed so that either a 262H delay or a 262H delay recycles for each field.

In such a manner, even if a rapid change of the signal suddenly occurs only in the present field relative to the preceding and next field picture signals, because, as a matter of course, the displayed picture is determined as is moving by the detection of motion in the twice preceding field, the changeover switch 25 selects the signal for interpolation in field. Thus, there is no possibility of deteriorating the quality of the picture due to the loss of the correlation between the scanning lines constituting each field picture.

Also, in the embodiment of FIG. 6, the result of determination of the motion speed is represented by the "H" and "L" signals so that the speeds are classified into the standstill and motion. But, to improve the correlation between the scanning lines to make smooth motion of the picture, it is also possible to divide the interval between the standstill and motion into several steps and to treat the signal for interpolation within field and the signal for interpolation between fields in combination at a suitable ratio depending on which step is taking place.

Figure 8:
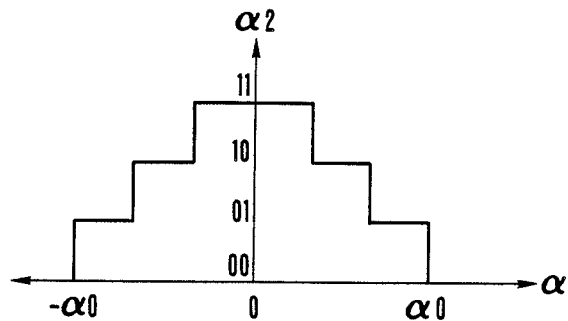
FIG. 8 is a graph illustrating the quantizing characteristic of a non-linear quantizing circuit shown in FIG. 7.
Figure 7:
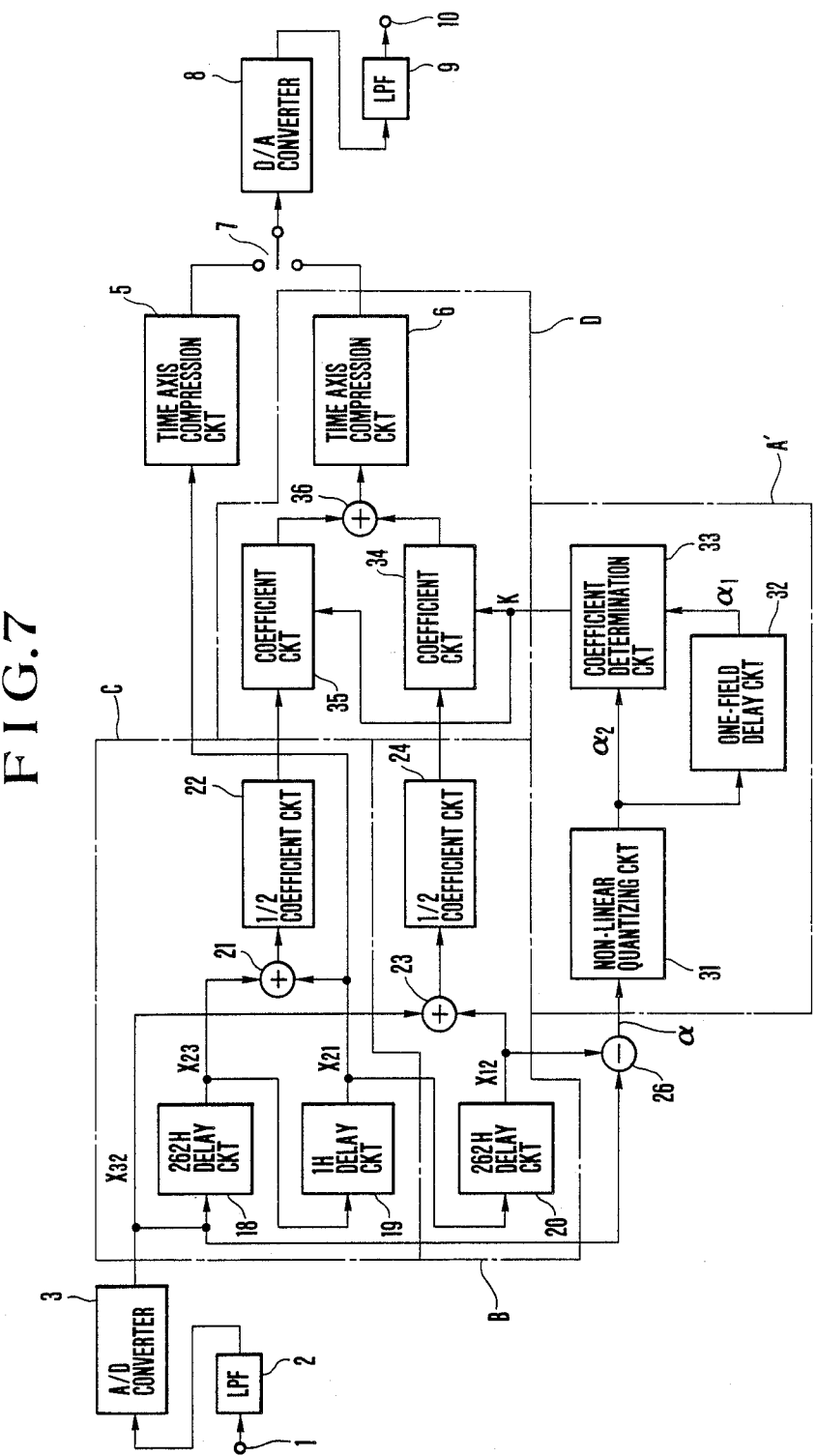

FIGS. 7 and 8 illustrate the second embodiment of the invention using this treatment. In the following, the difference from the above-described first embodiment will be explained in detail.

This embodiment has features that the absolute value circuit 28 and the comparator 27 of the above-described first embodiment are replaced by a non-linear quantizing circuit 31, that the AND circuit 30 is replaced by a coefficient determining circuit 33, and that the switch 25 is replaced by coefficient circuits 34 and 35 and an adder 36.

The non-linear quantizing circuit 31 performs compression of the information amount of the motion signal to decrease the memory capacity of the 1-field delay circuit 32. For example, as shown in FIG. 8, the difference signal is non-linearly quantized to, for example, 2 bits, depending on its magnitude. This value $\alpha_2$ or the converted difference signal $\alpha_2$ is supplied to the coefficient determining circuit 33 and the 1-field delay circuit 32. The coefficient determining circuit 33 performs determination of a coefficient K for the coefficient circuits 34 and 35 from the difference signal between the preceding and next field. As its determining method, it can be considered that, for example, whichever signal, $\alpha_1$ or $\alpha_2$, is smaller is selected and, depending on this, a value of the interpolation mixture coefficient K is determined. The coefficient circuits 34 and 35 are set by the output of the coefficient determining circuit 33 which represents the coefficient K to multiply the signal for interpolation within field and the signal for interpolation between fields by K and (1-K) respectively. The thus-multiplied signals are mixed by the adder 36 to form an interpolating signal which is then supplied to the time axis compression circuit 6.

In such a manner, according to this or second embodiment, a more appropriate interpolating signal can be obtained, depending on the speed of motion.

In FIGS. 6 and 7, as the motion detecting signal, use is made of the inter-frame difference signal. But, the invention is not confined thereto. For example, the normalized value of the inter-frame difference signal by the absolute sum of differences between the spatial adjacent picture elements in the scanning pattern may be used in place of the inter-frame difference signal.

Also, in FIG. 6, another variation may be made such that the output of the comparator 27 takes "H" when the displayed picture is seen as moving, and "L" when it is seen as standstill, and that the AND circuit 30 is replaced by an OR circuit.

As has been described above, according to the invention, a change of the picture between the successive two of the frames can be detected accurately and reliably. This produces an advantage of selecting the one of the interpolation treatments which is suited to the speed of motion of the picture. Therefore, even when one of the successive field signals largely changes from the other, this can be detected, so that proper treatment to the interpolation in order to insure that an excellent high-resolution picture is obtained.

What is claimed is:

1. A picture signal converting device in which such frame of picture signal as corresponding to one frame of picture plane is constituted with a group of field picture signals corresponding to a plurality of field picture planes each one of which has a prescribed number of scanning lines, and a number of scanning lines of each field picture plane constituting the frame of picture plane is increased, comprising:
   (A) input means for consecutively entering such field picture signal as corresponding to each one of said field picture plane;
   (B) first interpolating signal forming means for forming a first interpolating signal by using such field picture signal as corresponding to other field picture plane than a first field picture plane entered by said input means;
   (C) second interpolating signal forming means for forming a second interpolating signal by using such first field picture signal as corresponding to the first field picture plane entered by said input means;
   (D) motion detecting means for detecting an amount of movement of a picture by using such second and third field picture signals as corresponding to second and third field picture planes entered by said input means adjacently to such first field picture signal as corresponding to said first field picture plane;
   (E) holding means for holding a detection result at such time as a prescribed period of time beforehand at said motion detecting means; and
   (F) interpolating picture signal forming means for forming an interpolating picture signal for said first field picture plane by using at least one of said first interpolating signal and said second interpolating signal depending on a first detection result in said motion detecting means and a second detection result held in said holding means.

2. A device according to claim 1, wherein said first interpolating signal forming means is so arranged as forming, as the first interpolating signal, an average field picture signal equivalent to an average of such field picture signal as corresponding to other field picture plane than said first field picture plane which corresponds to a position of the scanning lines interpolated by the interpolating picture signal formed by said interpolating picture signal forming means.

3. A device according to claim 1, wherein said second interpolating signal forming means is so arranged as forming, as the second interpolating signal, an average field picture signal equivalent to an average of such first field picture signal as corresponding to scanning lines above and below the position of the scanning line interpolated by the interpolating picture signal formed by said interpolating picture signal forming means in the first field picture plane.

4. A device according to claim 1, wherein said interpolating picture signal forming means is so arranged as comparing a first detection result in said motion detecting means and a second detection result held at said holding means and forming an interpolating picture signal for said first field picture plane by using at least one of said first interpolating signal and said second interpolating signal depending on a changed state of the results.

5. A device according to claim 1, wherein said interpolating picture signal forming means includes:
   (A) adding means for adding said first interpolating signal and said second interpolating signal; and
   (B) addition ratio control means for comparing the first detection result in said motion detection means and the second detection result held in said holding means, and controlling an addition ratio of said first interpolating signal and said second interpolating signal at said adding means depending on the changed state of the results.

6. A device according to claim 1, wherein said interpolating picture signal forming means includes:
   (A) adding means for adding said first interpolating signal and said second interpolating signal; and
   (B) addition ratio control means for comparing the first detection result at said motion detecting means and the second detection result held at said holding means and controlling an addition ratio between said first interpolating signal and said second interpolating signal at said adding means depending on the detection result which indicates that the movement of a picture is large.

7. A device according to claim 1, wherein said interpolating picture signal forming means includes:
   (A) a first coefficient multiplying circuit for multiplying said first interpolating signal by a coefficient;
   (B) a second coefficient multiplying circuit for multiplying said second interpolating signal by a coefficient;
   (C) an adding circuit for adding an output of said first coefficient multiplying circuit and an output of said second multiplying circuit; and
   (D) a coefficient setting circuit for comparing the first detection result at said motion detecting means and the second detection result held at said holding means and setting each coefficient which is used for multiplying each interpolating signal at said first coefficient multiplying circuit and said second coefficient multiplying circuit depending on a changed state of said results.

8. A device according to claim 1, wherein said first interpolating signal forming means is so arranged as forming said first interpolating signal by using such second and third field picture signals as corresponding to the second and third field picture planes entered by said input means adjacently to such first field picture signal as corresponding to said first field picture plane.

9. A device according to claim 8, wherein said motion detecting means is so arranged as detecting an amount of movement of a picture between said second and third field picture planes by using such second and third field picture signals as corresponding to the second and third field picture planes entered by said input means adjacently to such first field picture signal as corresponding to said first field picture plane.

10. A device according to claim 9, wherein said interpolating picture signal forming means is so arranged as including a changeover circuit for selectively producing said first interpolating signal and said second interpolating signal and said changeover circuit produces the second interpolating signal when a detection result in said motion detecting means changes.

11. A device according to claim 10, wherein said interpolating picture signal forming means includes a logical circuit for controlling said changeover circuit by using said first detection result obtained by said motion detecting means and said second detection result held in said holding means.

12. A picture signal converting device in which such frame of picture signal as corresponding to one frame of picture plane is constituted by a group of field picture signals corresponding to a plurality of field picture planes each one of which has a prescribed number of scanning lines, and a number of scanning lines of each field picture plane constituting said frame of picture plane is increased, comprising:
  (A) input means for consecutively entering such field picture signal as corresponding to each one of said field picture plane;
  (B) first interpolating signal forming means for forming a first interpolating signal by using such field picture signal as corresponding to other field picture plane than a first field picture plane entered by said input means;
  (C) second interpolating signal forming means for forming a second interpolating signal by using the first field picture signal corresponding to the first field picture plane entered by said input means;
  (D) difference information signal generating means for generating a difference information signal between a second field picture plane and a third field picture plane by using such second and third field picture signals as corresponding to the second and third field picture planes entered by said input means adjacently to the first field picture signal corresponding to said first field picture plane;
  (E) information compressing means for compressing the information of said difference information signal and producing a compressed difference information signal; and
  (F) interpolating picture signal forming means for forming an interpolating picture signal for said first field picture plane by using at least one of said first interpolating signal and said second interpolating signal depending on a state of said compressed difference information signal produced from said information compressing means.

13. A device according to claim 12, wherein said first interpolating signal forming means is so arranged as forming said first interpolating signal by using second and third field picture signals corresponding to the second and third field picture planes which are entered by said input means adjacently to the first field picture signal corresponding to said first field picture plane.

14. A device according to claim 12, wherein said first interpolating signal forming means is so arranged as forming, as a first interpolating signal, an average field picture signal equivalent to an average of the field picture signals corresponding to other field picture plane than said first field picture plane corresponding to the position of scanning lines interpolated by the interpolating signal formed by said interpolating picture signal forming means at the first field picture plane.

15. A device according to claim 12, wherein said second interpolating signal forming means is so arranged as forming, as the second interpolating signal, an average field picture signal equivalent to an average of the first field picture signal corresponding to the scanning lines above and below the position of the scanning lines interpolated by the interpolating picture signal formed by said interpolating picture signal forming means at the first field picture plane.

16. A device according to claim 12, wherein said information compressing means includes a non-linear quantitizing circuit.

17. A device according to claim 12, wherein said interpolating picture signal forming means includes holding means for holding a compressed difference information signal produced by said information compressing means a prescribed period of time beforehand.

18. A device according to claim 17, wherein said interpolating picture signal forming means is so arranged as comparing a first difference information signal produced by said information compressing means and a second difference information signal held by said holding means and forming an interpolating picture signal for said first field picture plane by using at least one of said first interpolating signal and said second interpolating signal depending on a changed state of said signals.

19. A device according to claim 17, wherein said interpolating picture signal forming means is so arranged as comparing a first difference information signal produced by said information compressing means and a second difference information signal held by said holding means and forming an interpolating picture signal for said first field picture plane by using at least one of said first interpolating signal and said second interpolating signal depending on the difference information signal which indicates that the difference value is large.

20. A picture signal converting device in which such frame of picture signal as corresponding to one frame of picture plane is constituted with a group of field picture signals corresponding to a plurality of field picture planes each one of which has a prescribed number of scanning lines and a number of scanning lines of each field picture plane constituting said frame of picture plane is increased, comprising:

(A) input means for consecutively entering such field picture signals as corresponding to each one of said field picture planes;
(B) first interpolating signal forming means for forming a first interpolating signal by using such field picture signals as corresponding to other field picture plane than a first field picture signals entered by said input means;
(C) second interpolating signal forming means for forming a second interpolating signal by using a first field picture signal corresponding to the first field picture plane entered by said input means;
(D) motion detecting means for detecting an amount of movement of a picture between second and third field picture planes by using the second and third field picture signals which correspond to the second and third field picture planes and are entered by said input means adjacently to such first field picture signal as corresponding to said first field picture plane; and
(E) interpolating picture signal forming means for forming an interpolating picture signal for said first field picture plane by using both of said first interpolating signal and said second interpolating signal depending on the detection result of said motion detecting means.

21. A device according to claim 20, wherein said interpolating picture signal forming means includes:
(A) adding means for adding said first interpolating signal and said second interpolating signal; and
(B) addition ratio control means for controlling the addition ratio of said first interpolating signal and said second interpolating signal in said adding means in accordance with the detection result of said motion detecting means.

22. A device according to claim 20, wherein said interpolating picture signal forming means includes:
(A) a first coefficient multiplying circuit for multiplying said first interpolating signal by a coefficient;
(B) a second coefficient multiplying circuit for multiplying said second interpolating signal by a coefficient;
(C) an adding circuit for adding an output of said first coefficient multiplying circuit and an output of said second coefficient multiplying circuit; and
(D) a coefficient setting circuit for setting each coefficient which is used for multiplying each interpolating signal in said first coefficient multiplying circuit and said second coefficient multiplying circuit in accordance with the detection result of said motion detecting means.

* * * * *